Patented June 21, 1932

1,864,099

UNITED STATES PATENT OFFICE

GERHARD STEIMMIG, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CELLULOSE ESTER LACQUERS

No Drawing. Application filed July 3, 1928, Serial No. 290,266, and in Germany April 24, 1925.

I have found that cellulose ester lacquer coatings of particularly high suppleness and elasticity are obtained when incorporating with a cellulose ester lacquer, especially such as are prepared from cellulose nitrate or cellulose acetate, a phthalic ester of the general formula

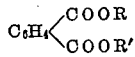

in which R indicates the radical of a mono alkyl ether of a glycol such as ethylene glycol, diethylene gylcol

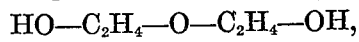

propylene glycol or the like, and R' means either another radical of the same or a different mono alkyl ether of a glycol or an alkyl group with from 2 to 5 carbon atoms. It is most suitable to add from 10 to 60 per cent of the weight of the dry cellulose ester of the said phthalic ester.

When incorporating the said phthalic esters with cellulose nitrate lacquers it is often advantageous to add to the lacquer resins capable of being combined with cellulose nitrate. An example of such resins are the artificial resins obtained by polymerization of vinyl esters and the like. I prefer to employ artificial resins obtained from cyclic ketones, such as cyclohexanone, either alone or with phenols and aldehydes.

For use in cellulose acetate lacquers particularly those phthalic esters are suitable which contain at least one radical of ethylene glycol mono-methyl or mono-ethyl ether.

The said phthalic esters volatilize very slightly from the lacquer coatings and are accordingly capable of imparting these coatings a lasting high suppleness and elasticity.

The use of the said phthalic esters does not interfere with the employment of volatile solvents and other additions usual in the lacquer industry, and in particular it is possible and sometimes advantageous to employ the said phthalic esters in mixture with other plasticizers.

The lacquers as a rule contain from 4 to 20 per cent of cellulose nitrate, the amount of which may vary according to the quality of the cellulose nitrate (for example) its viscosity employed, further 10 to 60 per cent based on the weight of the dry cellulose nitrate of an ester as herein specified, and 0 to 50 per cent based on the weight of dry cellulose nitrate of an ester.

When acetyl-cellulose is employed, the lacquers may contain 4 to 12 per cent of acetyl-cellulose soluble in acetone, and 10 to 60 per cent by weight of the acetyl-cellulose of an ester as hereinbefore specified. Resins are in this case not usually added.

The following examples will further illustrate how the said invention may be carried out in practice, but the invention is not limited thereto. The parts are by weight.

Example 1

100 parts of cellulose nitrate, 25 parts of an artificial resin obtained from methyl-cyclohexanone, and 25 parts of the neutral phthalic ester of ethylene glycol monobutyl ether or di-ethylene glycol monoethyl ether are dissolved in a mixture of 350 parts of butyl acetate, 100 parts of butanol and 400 parts of a mixture of ethyl alcohol, benzene and benzine. A lacquer suitable for application by spraying is obtained which produces firmly adhering, highly elastic coatings of good lustre.

Example 2

50 parts of cellulose acetate soluble in acetone and 20 parts of the neutral phthalic ester of ethylene glycol mono-methyl ether are dissolved in a mixture of 500 parts of the acetate of ethylene glycol mono-methyl ether, 200 parts of methyl acetate, 100 parts of ethyl acetate and 130 parts of ethyl alcohol. The solution forms a highly elastic and very supple coating.

This application is a continuation in part of my application for Patent Ser. No. 103,951, filed April 22nd, 1926.

What I claim is:—

1. A composition of matter comprising 100 parts of cellulose nitrate, 25 parts of an artificial resin obtained from methyl-cyclohexanone, 25 parts of the neutral phthalic ester of ethylene glycol mono-butyl ether, 350 parts of butyl acetate, 100 parts of butanol and 400 parts of a mixture of ethyl alcohol, benzene and benzine.

2. A composition of matter comprising a cellulose ester, a solvent therefor, and a neutral phthalic ester of a monoalkyl ether of a glycol.

3. A composition of matter comprising a cellulose nitrate, a solvent therefor, and a neutral phthalic ester of a monoalkyl ether of a glycol in a quantity amounting to from 10 to 60 per cent of the weight of the dry cellulose nitrate.

4. A composition of matter comprising a cellulose ester, a solvent therefor, a neutral phthalic ester of a monoalkyl ether of a glycol and a cyclic ketone resin.

5. A composition of matter comprising a cellulose nitrate, a solvent therefor, a neutral phthalic ester of a monoalkyl ether of a glycol in a quantity amounting to from 10 to 60 per cent of the weight of the dry cellulose nitrate and a cyclic ketone resin.

In testimony whereof I have hereunto set my hand.

GERHARD STEIMMIG.